United States Patent
Morgan (10) Patent No.: US 6,840,162 B2
(45) Date of Patent: Jan. 11, 2005

(54) DUAL CONCENTRIC DOME MOLD

(76) Inventor: Fletcher Morgan, 4990 Coquina Key Dr., SE., St. Petersburg, FL (US) 33705

( * ) Notice: Subject to any disclaimer, the term of this patent is extended or adjusted under 35 U.S.C. 154(b) by 88 days.

(21) Appl. No.: 10/302,903

(22) Filed: Nov. 25, 2002

(65) Prior Publication Data
US 2004/0099152 A1 May 27, 2004

(51) Int. Cl.⁷ ................................ A47J 43/18
(52) U.S. Cl. .............. 99/428; 99/439; 99/442
(58) Field of Search .......... 99/428, 442, 439, 99/440, DIG. 15; 249/175, 176, 177, DIG. 1

(56) References Cited

U.S. PATENT DOCUMENTS

| | | | |
|---|---|---|---|
| 1,487,906 A | * | 3/1924 | White et al. ............... 99/439 |
| 1,852,966 A | | 4/1932 | Green |
| 2,156,145 A | * | 4/1939 | Cavett et al. .............. 99/439 |
| 2,595,684 A | * | 5/1952 | Lyons ........................ 99/433 |
| 2,833,654 A | * | 5/1958 | Sonnenshein et al. ...... 426/390 |
| 3,141,400 A | | 7/1964 | Powers |
| 3,296,956 A | | 1/1967 | Turner |
| 3,831,507 A | | 8/1974 | Wheaton |
| 4,812,323 A | | 3/1989 | Savage |
| 5,226,352 A | | 7/1993 | Savage |
| 5,528,981 A | * | 6/1996 | Pettit ......................... 99/428 |
| 5,948,313 A | | 9/1999 | Cahen |

* cited by examiner

Primary Examiner—Reginald L. Alexander
(74) Attorney, Agent, or Firm—John S. Hale; Gipple & Hale (57) ABSTRACT

An apparatus assembly for forming a compound dessert in a predetermined dome shape including a first outer mold having a dome shaped bowl with a closed semi-spherical end and an open end, and a ring shaped planar support base secured to said closed end of bowl body. A second dome shaped bowl of a smaller diameter is mounted in the chamber formed in the first mold bowl. A lip is formed on the open end of both bowls extending outward from the open end of each bowl which holds a retainer strap assembly holding the second inner mold bowl in place within the first outer mold bowl.

26 Claims, 6 Drawing Sheets

DUAL CONCENTRIC DOME MOLD

CROSS-REFERENCE TO RELATED APPLICATIONS

There are no related applications other than U.S. Design patent application Ser. No. 29/171,538, filed the same date as the present application on the device shown in FIG. 1.

TECHNICAL FIELD OF THE INVENTION

The present invention relates generally to the field of cake baking and desert molds. More particularly, the present invention concerns apparatus for baking a domed, semi-spherical or hemispherical cake or molded dessert having nested concentrically shaped components. The present invention thus relates to an apparatus assembly for baking a shaped type of dessert that can be termed a dual domed hemispherical or semi-spherical dome cake and/or combination dessert mold.

The present invention is thus directed toward an apparatus for molding cake batter, ice creams, gelatins or other desserts into a particular outer hemispherical shape with an inner separate mold having a smaller concentric hemispherical shape while setting or being baked. The invention particularly concerns a dome assembly which molds and/or bakes cakes or desserts in the shape of a hemispherical dome having a second inner composition shaped as a hemispherical dome.

BACKGROUND OF THE INVENTION

Food molds are well known in the prior art. A common baking pan is a food mold, with one open end, one closed end and a peripheral side wall. The closed end and side wall define a hollow volume that becomes the three-dimensional shape of a food product molded by the baking pan.

Some food pans, such as a baking pan for making angel food cake, have an annular hollow volume at the open end. The hollow volume is filled with a food composition and then baked. After baking, the pan is inverted to remove the shaped food composition from the open end. Thus, the open end is used to form the bottom of the final food product.

Some food molds have a centrally located indentation at the closed end. With a mold of this type, a first food composition may be placed and formed in the open end and a second food composition maybe placed in the complementary shaped indentation at the closed end. This provides a accurate fit for the second filler food composition within the first supporting food composition.

It can thus be seen that a number of devices have been used in the molding and baking of desserts to obtain molded desserts in a variety of configurations and for a variety of shaped configurations as described in the prior art. However dual domed desserts are rare because of the complexity in preparing same. While cakes are commonly referred to in the literature as being domed, in effect this is an occurrence which comes about as the batter expands during baking and does not equate to a hemispherical or semispherical shaped cake.

Historically, it was known in the prior art to bake bread bowls which were semi-spherical loaves of bread into which a cavity was carved for placement of salads or soups. A conventional bread bowl is typically made by forming raw bread dough on the top of a simple inverted bowl which is then placed into the oven for baking. Bread bowls made in this manner often rise from the inverted bowl so that the same presents an uneven appearance, requiring trimming and waste.

Hemispherical shaped or dome cakes having dual composition are popular in Italian dessert cooking and are generally known as "Zuccotto". These cakes are prepared by slicing previously baked sponge cake (Pan di Spagna) into thin, vertical slices, lining the interior of a bowl with plastic wrap and lining the plastic wrap in the bowl with overlapping pieces of the sponge cake slices. The slices of cake are then sprinkled with liquor and the dampened assembly is then covered with a plastic wrap and refrigerated. A center mixture of chocolate or other filling is poured into the cake lined bowl and the bottom or exposed surface of the filling is covered with other slices of cake. The entire cake is allowed to set for a number of hours, preferably overnight, inverted onto a platter and dusted with confectioners sugar. As can be seen, the process for making this cake is quite laborious in time and resources required. It has been found desirable to mold or form desserts or cake into a layered hemispherical or semi-spherical dome shape which can be baked and/or frozen and marketed as a specialized cake shape similar to that of the Italian "Zuccotto" cakes as the same make an elegant presentation. "Batter" as used herein in the application is meant to encompass cake batter, dough, malleable ice cream, gelatin or a malleable dessert which sets up in a rigid or semi-rigid shape.

Many prior art devices and techniques mold and bake dough of breads, batters of cakes, cookies, and other baked goods into various shapes including containers which may be used to hold other foods. For example, U.S. Pat. No. 4,812,323, issued Mar. 14, 1989, discloses a method for molding and baking cookie dough into a cup shape which can then be used to hold ice cream or other fillings in a similar manner to U.S. Pat. No. 3,296,956, issued Jan. 10, 1967, which also discloses a molding and baking apparatus for the baking of bread dough into a cup-like shape. U.S. Pat. No. 1,487,906, issued Mar. 25, 1924, discloses a pan for baking cake batter into a container shape for holding ice cream.

In U.S. Pat. No. 3,141,400 issued Jul. 21, 1964 a telescoping cake apparatus is disclosed with a center cone assembly which moves upward when the cake batter is baked forming a frustrum conical cake with a conical center cavity. A one piece strip cross link handle is secured to the upper edge of top of the expendable baking section and the cone by staples or the like.

A baked layered product with an apparatus for making same is shown in U.S. Pat. No. 3,831,507, issued Aug. 27, 1974. This baking assembly uses three baking pans to form a cylindrical bunt bowl body and lid which is placed over the body to hold the filling therein.

Similarly U.S. Pat. No. 1,852,966 issued Apr. 5, 1932 is directed toward a baking pan used for baking a cake with a hollow center so that the same can have a filling placed therein. A tapered tubular outer member has a core mold mounted thereon attached to a cover over the top of the tubular outer member.

U.S. Pat. No. 5,948,313, issued Sep. 7, 1999 is directed toward a mold assembly for making a baked edible shell. The mold assembly is constructed of an outer mold shell and an associated inner mold shell, the outer mold shell having a curved main portion with a central opening and an outer rim extending in a plane. The inner mold shell has a curved main portion with a central chimney shaped to pass through the outer mold central opening. The outer mold opening comprises a raised circular rim with an inwardly directed flange. The outer edge of the outer mold shell is formed with a rolled-up rim. When the edible material is being cooked, a metal strip with curved ends is mounted over the rolled rim of the outer shell mold as seen in FIGS. 4 and 5C to hold both mold-shells in relative positions to eliminate expansion of the edible material during cooking.

Another reference, U.S. Pat. No. 5,226,352 issued Jul. 13, 1993 directed toward a baking assembly which has an outer dome shaped member and an inner dome shaped member as shown in FIGS. 6 and 7. A flange extends outward from the upper edge of the outer dome member to seat the flange extending from the upper edge of the inner dome member. The flanges are held together by a C clamp or other fastening means. The inner dome shaped member is TEFLON* coated on its inside surface and outside surface allowing cake or dough to be baked in the outer dome mold and the inner mold.

In all baking pans, it is desirable to facilitate the partial escape of moisture from these apparatuses in order to develop a degree of porosity in the final baked product. At the same time, however, the batter must absorb some moisture to prevent excessive dehydration. It therefore becomes necessary to contain the batter at a pressure sufficient to limit the extent to which water is converted to steam, since the batter absorbs steam less easily than water, while allowing for a degree of conversion and escape. The batter must also be contained to prevent the escape of the cake itself due to its expansion during baking.

The present invention also solves the complex construction problems in assembling a domed cake or dessert through the use of a simple apparatus. In the present invention, it has been found desirable to facilitate the partial escape of moisture by using porosity in the inner dome bowl.

SUMMARY OF THE INVENTION

The present invention is directed toward an apparatus for simultaneously producing a dual layered semi-spherical or hemispherical dessert or cake using an outer dome shaped bowl with a ring base and an inner dome shaped bowl which is supported in the outer dome shaped bowl cavity by a support strip or strips which are fastened to the outer rim of the outer bowl. Each support strip is elevated to lie above a plane taken on the outer rim of the outer bowl so that expansion of the batter does not leave a marking or cause uneven expansion. Both of the bowls have a round lip extending outward at the end surface of the open end and extending around the circumference of the open end allowing the same to be easily grasped and handled by the user and snapped onto the support strips which support the inner bowl within the cavity of the outer bowl. The support strip has clamp mechanisms on both ends, with each clamp mechanism having an outside leg which engages and holds the outer rim of the outer bowl while an inside leg engages and holds the outer rim of the inner bowl. The combined cake sections from each of the outer and inner dome shaped bowls are stacked to form a dual semi-spherical or hemispherical configuration.

Another embodiment of the invention has a solid base in place of the ring base and uses a central ring assembly with four extending legs which engage the rim or lip of the outer bowl and a snap mechanism on the underside of the center ring to engage the rim or lip of the inner bowl.

It is an object of the invention to prepare two different composition food products into a single hemispherical shaped presentation.

It is another object of the invention to provide a cooking assembly for baking a cake that produces a uniformly shaped dome shaped cake with an internal composition of a similar but smaller shape that is resistant to tilting and rolling.

It is still another object of the invention to provide a cooking assembly which delivers heat energy evenly to all areas of the cake batter being baked.

Yet another object of the invention is to provide an apparatus that is easy to use, ruggedized and reliable.

It is a further object of the invention to mold cake batter or a dessert composition in an enclosure of a desired shape and bake or set the enclosure composition while maintaining heat and pressure at a precise desired level.

It is a still a further object of the invention to allow for the escape of moisture and gas from the inner bowl during baking through the use of a porous structure while preventing the mixing of the expanding batter.

It is a further object of the invention to provide a novel way of differentiating the heat applied to the molding and baking apparatus.

It is yet another object of the invention is to provide an cooking assembly which is easily broken into individual components and is easy to clean.

Another object of the invention is to provide a cooking assembly for simultaneously baking two hemispherical cakes of different sizes with one cake fitting into a cavity formed during the baking process in the outer cake to produce a uniform cake that is predictable and reproducible without size variance.

Still another object of the invention is to provide a cooking assembly that has one or more of the characteristics discussed above but which is relatively simple to use and requires a minimum of cooking skills.

In the accompanying drawings, there is shown illustrative embodiments of the invention from which these and other objectives, novel features and advantages will be readily apparent.

These and other objects, advantages, and novel features of the present invention will become apparent when considered with the teachings contained in the detailed disclosure along with the accompanying drawings.

DETAILED DESCRIPTION OF THE INVENTION

The preferred embodiment and best mode of the invention is shown in FIGS. 1 through 11.

Referring to the Figures, a molding or baking assembly 20 according to the invention is adapted to shape or mold cake batter, other compositions of baking goods or complimentary desserts such as ice cream, gelatins, puddings into a concentric domed layered dessert having a semispherical or hemispherical shape.

Figure 3:
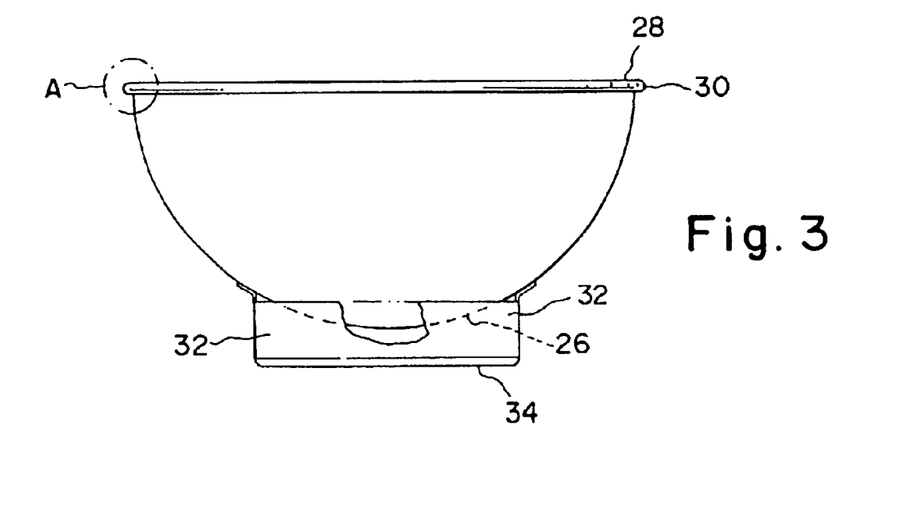
FIG. 3 is a front elevational view of the outer dome bowl component of FIG. 1.
Figure 4:
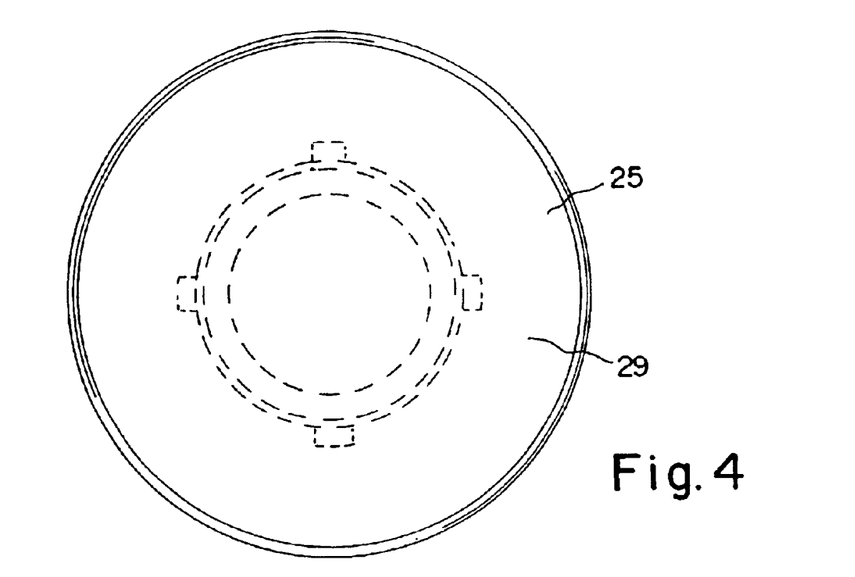
FIG. 4 is a top plan view of the outer dome bowl component of FIG. 3.
Figure 5:
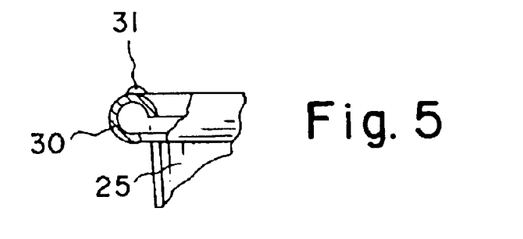
FIG. 5 is an enlarged cross sectional view of the outer bowl rim taken from the outer bowl component of FIG. 3.
Figures 6, 7:
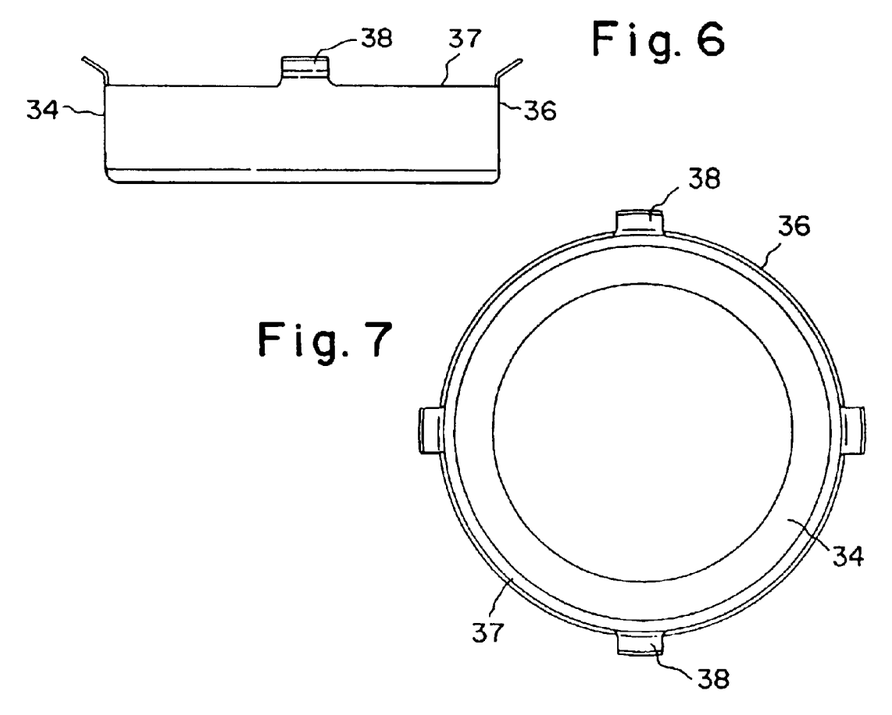
FIG. 6 is an enlarged side elevational view of the base ring of the outer bowl dome component of FIG. 3 removed from the outer bowl dome.
FIG. 7 is a top plan view of the base ring shown in FIG. 6.

The outer dome pan or bowl 22 is typically symmetrical with a concavo-convex spherical shape. The outer dome mold is constructed with a bowl body 24 having a spherical or curved closed bottom surface 26 and an open end 28 forming an interior chamber or cavity 29. The open end 28 is formed with a curved or rolled outer lip or rim 30 as shown in FIGS. 3 and 5. The outer lip 30 is curved in a circular configuration and preferably has a diameter of about 0.25 inches. The outer lip 30 can have a plurality of beads or protrusions 31 about 0.80 inches in length which extends upward about 0.03 inches from the outer lip top surface opposite each other which serve as reinforcement and hold support strip 70. It will be appreciated that the rim 30 will permit a pair of human hands or a tool such as a wooden handle to reach under and grasp the bowl body 24 or the inner dome bowl 50. A base ring member 32 is secured to the bottom surface 26 of the bowl body 24 to provide a flat base surface during working and/or cooking. The ring member 32 is preferably constructed of 22 gage C1018 cold rolled steel with an inwardly curved bottom planar flange 34 and a vertical side wall 36 having a top edge 37 which has four tabs 38 outwardly extending therefrom bent at an angle ranging from about 120° to 130°, preferably about 124°. The ring member 32 is secured to the base section of the bowl body 24 by welding or braising and has a cross section forming a "L" shape with the leg or flange 34 being about 1 inch wide forming a planar surface for seating the bowl in a stable condition. Each tab 38 is positioned on the ring circumference 90° from the other adjacent tabs located on the circular top edge 37 and has a length of approximately 1 inch. The base ring 32 preferably has a diameter of 4.25 inches and a height of about 1.07 inches when used with a 8.38 inch outer diameter bowl having a depth of 3.98 to 4.0 inches. When ring member 32 is mounted or secured to the bowl body 24, there is a clearance ranging from about 0.40 to about 0.60 inches, preferably about 0.47 inches from the lowest outer bottom surface of the bowl to the top of the support area upon which the ring member 32 is seated.

If desired, a bimetallic thermometer can be attached to the ring member 32 which thermometer would turn an appropriate color upon reaching the desired cooking temperature allowing the cook to ascertain that the desired temperature has been reached.

The bowl body 24 is preferably integrally constructed of sheet steel or stainless steel but can be constructed of copper, aluminum, cast iron, pyrex, glass, porcelain, ceramic or any type of microwaveable material at a uniform desired thickness commonly used for baking pans and containers. If desired, the bowl body can have its external surface coated with a non-corroding material such as tin or chromium. The bowl 24 therefore may be constructed of a single sheet of metal formed into the desired shape. The inside smooth surface 25 of the bowl is preferably coated with one or more nonstick coatings, such as for example TEFLON® (i.e., fluorocarbon polymers), (e.g., tetrafluroethylene and fluorinated ethylene propylene). The interior surface 25 of the bowl 24, which contacts the batter or dessert composition, is covered with TEFLON® in the preferred embodiment to ease the removal of the baked or chilled product from the bowl. The radial sloping of the inner wall 25 further eases removal of the final dessert composition. It will be appreciated by those skilled in the art that other shapes and geometries of pan assemblies are possible, and that the specifics of material of which it is made can be changed without departing from scope of the invention. For example, the mold may be formed as a cone, or other shape. Additionally, it can be stamped from a solid piece of material or spun from aluminum instead of formed from a sheet.

Figure 1:
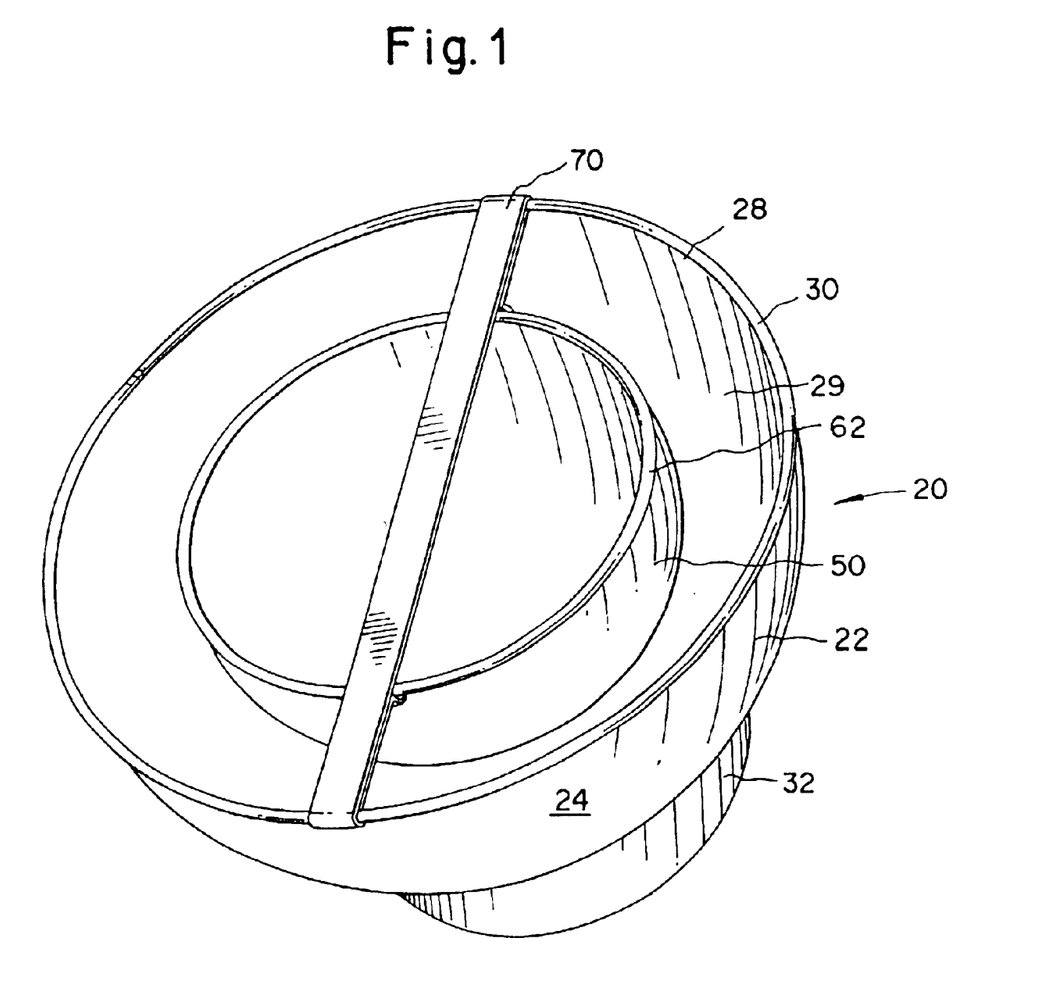
FIG. 1 is a perspective view of the dual concentric dome bowl apparatus of the present invention.
Figure 2:
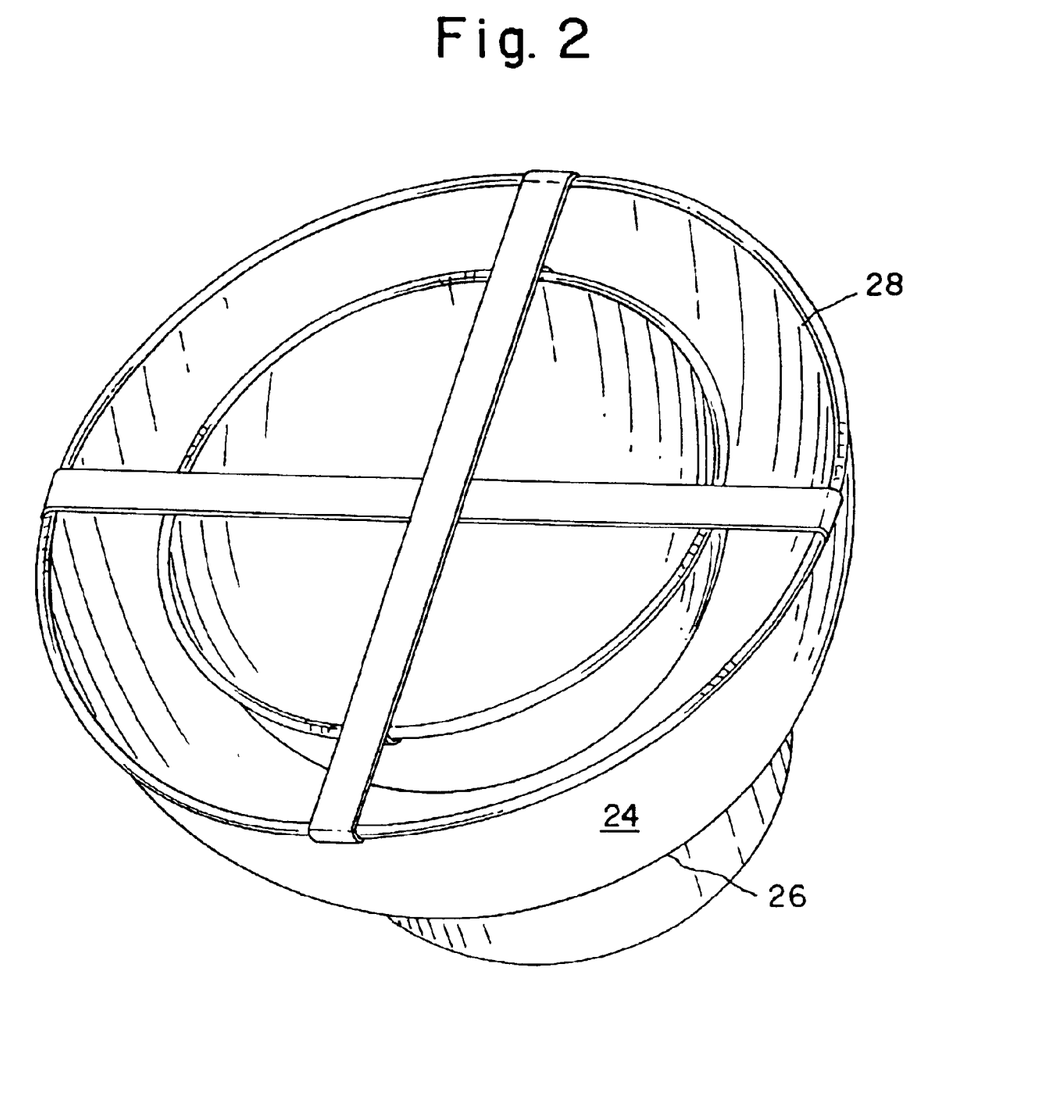
FIG. 2 is a perspective view of the dual concentric dome bowl apparatus of the present invention with two crossed support strips.
Figures 8, 9:
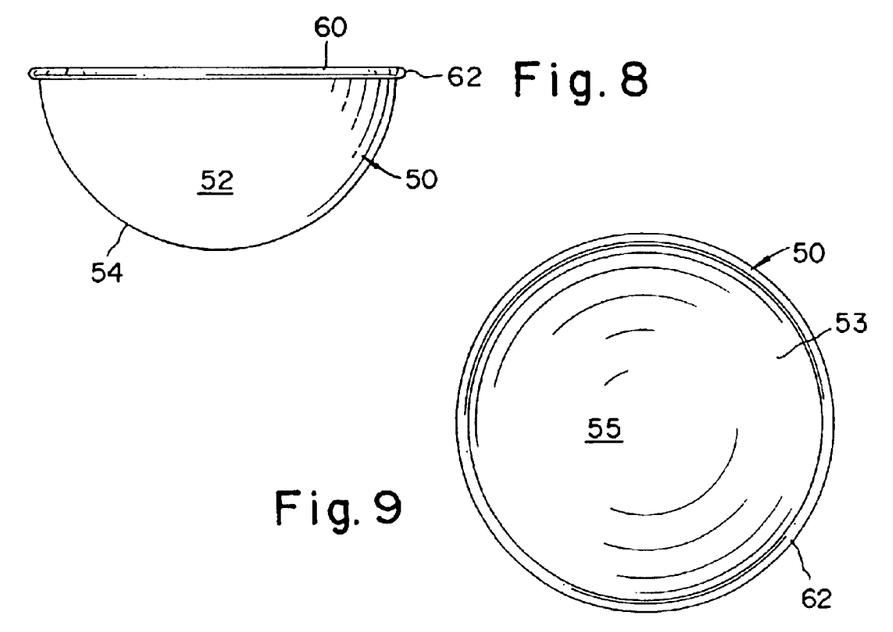
FIG. 8 is a side elevational view of the inner bowl component.
FIG. 9 is a top plan view of the inner bowl component of FIG. 8.

The inner bowl of the dessert or cake is obtained using a circular curved bowl 50 as shown in FIGS. 1, 8 and 9. The inner dome bowl 50 is typically symmetrical with a concavo-convex spherical shape constructed with a bowl body 52 having a spherical or curved closed bottom surface 54 and an open end 60 forming chamber 55. The open end 60 is provided with a curved or rolled outer lip or rim 62. The curved outer lip 62 preferably has a diameter of about 0.25 inches. It will be appreciated that the rim 62 will permit a pair of human hands or a tool such as a wooden handle to reach under and grasp the bowl body 52 or the inner dome bowl 50.

The bowl 52 is preferably constructed of porous material such as high temperature TEFLON coated high temperature fiberglass ranging from 5 to 10 mils in thickness or a stainless steel wire cloth also TEFLON coated on both sides, both of which are breathable an allow an air flow of 50 CFM which vents moisture during baking without batter coming through. The porous material has a sieve opening for the stainless steel wire cloth ranging from 0.0165+ or −0.0005 and the stainless steel is STME 1187. The inside and outside surfaces of the bowl 52 are preferably coated with one or more nonstick coatings, such as for example TEFLON® (i.e., fluorocarbon polymers), (e.g., tetrafluroethylene and fluorinated ethylene propylene). Alternately the bowl body 52 can be constructed of sheet steel, stainless steel, copper, aluminum, cast iron, pyrex, glass, porcelain, ceramic or any type of microwaveable material at a uniform desired thickness commonly used for baking pans and containers.

The interior surface 53 of the bowl 50, which contacts the batter or dessert composition is smooth and is covered with TEFLON® in the preferred embodiment to ease the removal of the baked or chilled product from the bowl. The radial sloping of the inner wall 53 further eases removal of the final dessert composition. It will be appreciated by those skilled in the art that other shapes and geometries of pan assemblies are possible, and that the specifics of material of which it is made can be changed without departing from scope of the invention.

Figure 10:
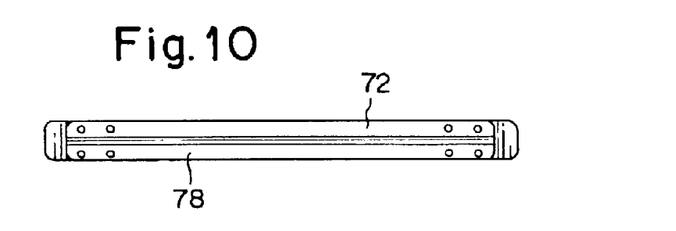
FIG. 10 is a top plan view of the strip support for the inner bowl component attached to the outer bowl as shown in FIG. 1.
Figure 11:
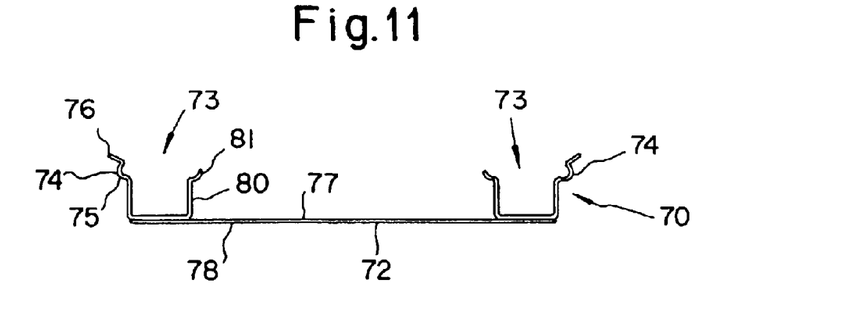
FIG. 11 is a side elevational view of the strip support shown in FIG. 10.
Figure 12:
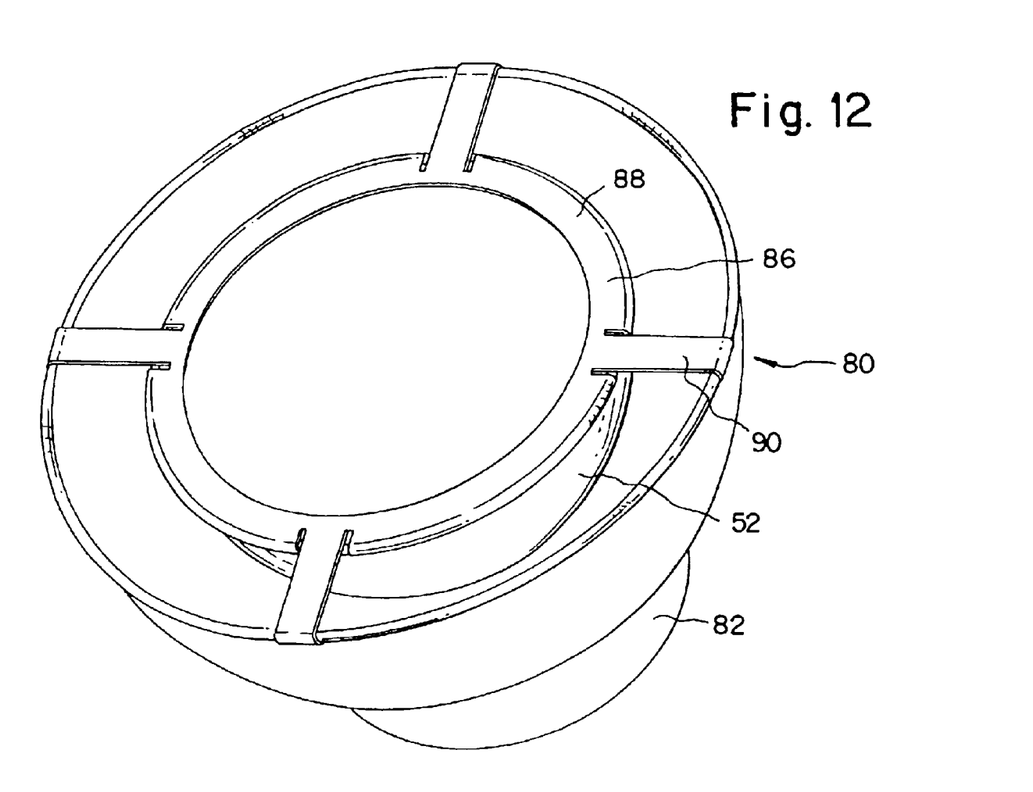
FIG. 12 is a perspective view of an alternative embodiment of the dual concentric dome bowl apparatus.
Figure 13:
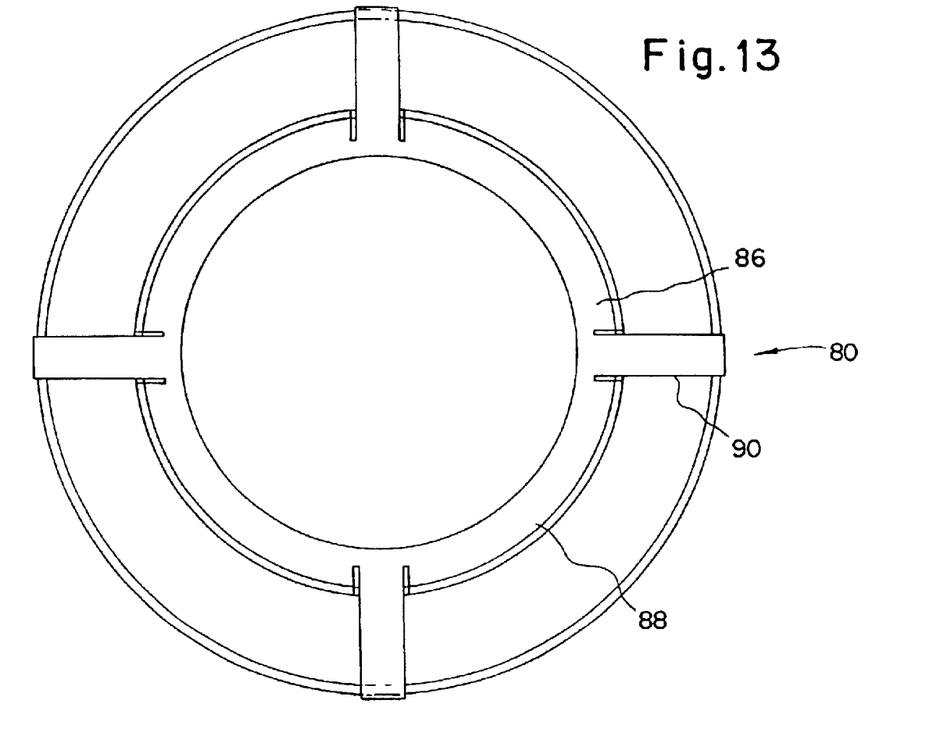
FIG. 13 is a top plan view of the apparatus of FIG. 12.

The inner bowl 24 is mounted on the outer bowl 50 by using one or more support strips 70 as shown in FIGS. 10 and 11. Each strip is constructed with a single base member 72 having a support clamp mechanism 73 mounted on each end of the base member 72 by rivets or welding. Each clamp mechanism 73 is formed with an outer leg 74 which extends downward from the underside 77 of the base member 72. The leg 74 is provided with a curved end 75 which fits around the outer rim or lip 30 of the bowl body 24. The curved end 75 extends downward from the underside 77 of the base member 72 about 0.75 inches. The curved end 75 has a flange projection 76 which extends outward at an angle of 30 degrees from a plane taken along the length of the base member 72 to provide easy attachment and detachment to the lip 30. An integral bridge section 78 of the base member 72 provides an attachment surface for the two clamp mechanisms. An inner leg 80 extends outward from bridge section 78 positioned inside of the outer leg 74 and ends in a curved flange 81 which projects inward to fit under the bottom surface of lower lip or rim 62 of the inner bowl body 52. The base member 72 preferably has a length of about 8.0 inches. The flange 76 allows the curved end portion 75 of outer leg 74 to be easily placed around the outer lip 30 of the bowl body 24. The width of the base member 72 is about 0.75 inches.

In operation cake batter is poured, about ⅔ to ¾ full, in the bowl body 24 and the inner bowl 52 is placed in chamber 29 of the outer dome pan 22 down into the batter in chamber 29. The inner bowl 52 is secured into place by mounting the same to its end clamp mechanisms 73 which fit over rim 30 holding the two bowls 24 and 52 in a fixed relationship. A second cake batter of a different flavor as for example chocolate is poured in the chamber of bowl 52 about ⅔ to ¾ of the depth of the bowl 52. It should be noted that the support strip 70 under surface is elevated by the legs of clamp mechanisms 73 over a plane taken across the top rim 30 of the outer bowl 24 and the top rim 62 of the inner bowl 53 so that it will not imprint the baked batter which has expanded during baking allowing the bottom to be easily trimmed.

After the batter 24 is molded and baked by the application of heat to the bowls, the support strip member 72 is removed and the inner dome mold 50 is taken out of its nesting position in the outer mold bowl 24. The TEFLON® coating of the interior and exterior surface of the inner mold bowl 52 facilitates removal of the mold without tearing or damaging the final baked product. The baked cake is then removed from the inner mold bowl body 52, the TEFLON® coating of the interior surface of the inner bowl mold facilitating the dessert removal. The result is a baked goods, which is hemispherically shaped and ready to eat. The TEFLON® coating of the interior surface 25 of the outer dome mold 24 facilitates removal of the baked product without tearing or damaging the final baked product. The interior cake is then placed in the cavity formed by inner mold bowl body 52 and the inner smooth surface 25 of bowl body 24 and the composite assembly is inverted onto a serving area for frosting, icing or other decoration preparatory to being served. The result is a dual domed cake or dessert which is domed shaped as a hemisphere and ready to eat. The baked goods may be filled or coated with ice cream, pudding, icing or other sweet filling for a dessert pastry.

Figures 14, 15:
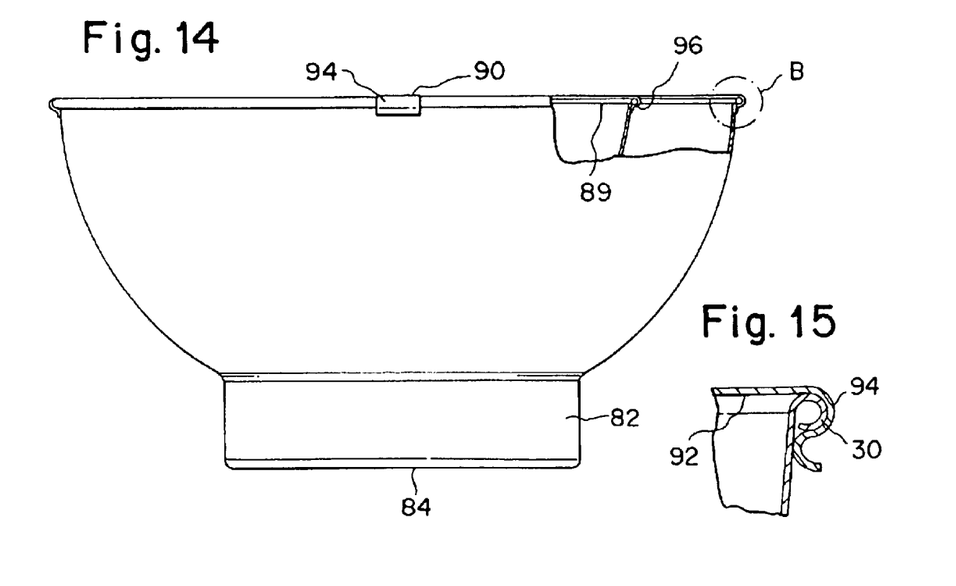
FIG. 14 is a side elevational view of the apparatus of FIG. 12 partially in section.
FIG. 15 is an enlarged partial cross sectional view of the end snap of the support leg of the support mechanism of the apparatus of FIG. 12.

Another embodiment 80 of the invention as shown in FIGS. 12–15 has a solid circular base 82 with a flat base planar surface 84 secured to the bottom of the outer dome mold bowl 24 in place of ring member 32. The strip support member 70 is also replaced in this embodiment by a center ring support assembly 86 integrally constructed with a center ring member 88 having a width defined by the inside diameter and outside diameter which extends both outside and inside of the outside rim 62 of the inner dome bowl 52 so that it covers the top rim of the inner bowl 52. A plurality of legs 90 extend outward from the center ring member 88 at approximately 90 degrees around the ring and the bottom surface 92 and as is shown in FIG. 15, an enlargement of circle B of FIG. 14, at the end of each leg is formed with a circular clamp extension 94 which engages the rim 30 of the outer bowl. A plurality of curved clamp members 96 are mounted on the bottom surface 89 of the ring 88 to engage and hold the rim on the inner dome bowl 52. The inner and outer bowls are constructed of the same materials as the bowls previously described.

The cooking assembly can be enhanced by providing additional shaped lips for handling. Similarly, although aluminum, sheet steel and/or stainless steel is preferred for the concavo-convex outer bowl body, any suitable structural material could be used in its place, as for example, alloyed steel, copper, brass, cast iron or even glass or ceramic, such as stoneware. The inner bowl body has the same structural body as that of the preferred embodiment.

The principles, preferred embodiments and modes of operation of the present invention have been described in the foregoing specification. However; the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. An apparatus assembly for forming a compound dessert in a predetermined shape comprising:
   a first outer mold comprising a dome shaped bowl with a closed semi-spherical end and an open end defining a cavity, a support base comprising a ring member with a planar bottom surface secured to said closed end of said outer bowl body, said open end defining a lip extending outward from said bowl open end; and
   a second inner mold comprising a dome shaped bowl with a closed semi-spherical end and an open end of lesser diameter then said first mold defining a cavity and a lip extending outward from said bowl open end and at least one support strip assembly mounted to said first outer mold lip and said second inner mold lip to hold said second mold bowl within said cavity of said first outer mold bowl body.

2. An apparatus assembly as claimed in claim 1 for forming a compound dessert in a predetermined shape wherein an inner surface of said first outer mold bowl and said second inner mold bowl and an outer surface of said second mold bowl are coated with a nonstick material.

3. An apparatus assembly as claimed in claim 2 for forming a compound dessert in a predetermined shape wherein said nonstick compound is tetrafluroethylene.

4. An apparatus assembly as claimed in claim 2 for forming a compound dessert in a predetermined shape wherein said nonstick compound is fluorinated ethylene propylene.

5. An apparatus assembly as claimed in claim 1 for forming a compound dessert in a predetermined shape wherein said ring member has a plurality of tabs extending away from an axis taken through the center of the ring member.

6. An apparatus assembly as claimed in claim 5 for forming a compound dessert in a predetermined shape wherein said tabs are positioned on an edge of said ring and are located 90° from each other.

7. An apparatus assembly as claimed in claim 5 for forming a compound dessert in a predetermined shape wherein said tabs extend outward from an axis through the center of the ring member at an angle ranging from about 120° to about 130°.

8. An apparatus assembly as claimed in claim 5 for forming a compound dessert in a predetermined shape wherein said tabs extend outward from an axis through the center of the ring member at an angle ranging about 124°.

9. An apparatus assembly as claimed in claim 1 wherein said ring member has an "L" shaped cross section.

10. An apparatus assembly as claimed in claim 1 wherein said ring member has a bottom flange extending toward the center axis of said ring, said bottom flange having a planar bottom surface.

11. An apparatus assembly as claimed in claim 1 for forming a compound dessert in a predetermined shape wherein said outer mold bowl is seated in said ring member against tabs extending from an upper surface of said ring member with the bottom of the bowl being raised above a plane taken across the bottom edge of said ring member.

12. An apparatus assembly as claimed in claim 11 for forming a compound dessert in a predetermined shape wherein said outer mold bowl is raised from about 0.45 inches to 0.55 inches from said plane taken across the bottom edge of said ring.

13. An apparatus assembly as claimed in claim 1 for forming a compound dessert in a predetermined shape wherein said inner mold bowl is constructed of high temperature porous fiberglass coated with anon stick material on at least one surface, said inner mold bowl allowing gas flow therethrough while preventing a food composition from flowing therethrough.

14. An apparatus assembly as claimed in claim 1 for forming a compound dessert in a predetermined shape wherein said support strip assembly comprises a linear strip member with a plurality of clamp members mounted thereon.

15. An apparatus assembly as claimed in claim 14 wherein said linear strip member includes an outer clamp mechanism at each end of said strip member, said outer clamp mechanism on the each end of said strip being secured to said strip, said clamp mechanism comprising a support bridge secured to said strip member, a leg integrally formed with said support bridge having a curved end extending from the end of said leg and a second inner leg integrally formed with said support bridge having an angled flange extending from the end of said leg.

16. An apparatus assembly as claimed in claim 14 wherein said linear strip member includes a plurality of inner clamp mechanisms secured to said strip member, each said inner clamp mechanism comprising a support bridge secured to said strip member, and a leg integrally formed with said support bridge having a curved end to engage a lip of said second inner mold bowl.

17. An apparatus assembly as claimed in claim 14 wherein said strip member is an assembly comprising a circular center section with a plurality of legs connected thereto extending outward from said center section, each leg having a clamp member mounted thereto to engage said lip of said outer mold bowl.

18. An apparatus assembly as claimed in claim 14 wherein said strip member comprises a circular center section with a plurality of legs connected thereto extending outward from said center section and said center section has a plurality of clamp members mounted thereto to engage said lip of said inner mold bowl.

19. An apparatus for forming and baking batter in a predetermined shape comprising:
   a first hemispherical outer baking bowl having a lip extending around its outer circumference;
   a second hemispherical inner baking bowl which is adapted to be mounted in said outer baking bowl; said inner baking bowl being constructed of a porous material allowing air to pass therethrough, said inner baking bowl forming a cavity for placement of an interior food component within a food component molded in said first hemispherical outer baking bowl when said first and second baking bowls are mounted together;
   support means mounted to said outer and inner bowl holding the first and second baking bowls together, said support means comprising a strip member with a clamp mechanism at each end of said strip member, said outer clamp mechanism on the ends of said strip secured to said strip member, said clamp mechanism comprising a support bridge secured to said strip member, a leg integrally formed with said support bridge having a curved end extending from the end of said leg and a second inner leg integrally formed with said support bridge having an angled flange extending from the end of said leg.

20. An apparatus for forming and baking batter in a predetermined shape comprising:
   a first hemispherical outer baking bowl having a lip extending around its outer circumference;
   a second hemispherical inner baking bowl which is adapted to be mounted in said outer baking bowl; said inner baking bowl being constructed of a porous material allowing air to pass therethrough, said inner baking bowl forming a cavity for placement of an interior food component within a food component placed in said first hemispherical outer baking bowl when said first and second baking bowls are mounted together;
   support means mounted to said outer and inner bowl holding the first and second baking bowls together, said support means comprising a circular center section with a plurality of legs connected thereto extending outward from said center section, each leg having a clamp member mounted thereto to engage said lip of said outer mold bowl.

21. An apparatus assembly for forming a compound dessert in a predetermined shape comprising:
   a first mold having a dome shaped bowl with a closed spherical end and an open end forming a chamber, a planar support base secured to said closed end of bowl body and a lip extending outward from said bowl open end, said planar support base comprising a ring member secured to the base of said dome shaped bowl, said ring member being formed with a vertical side wail and an inwardly formed flange having a planar bottom surface extending from said vertical side wall;
   a second mold having a dome shaped bowl with a spherical end and an open end mounted in said first mold bowl chamber and a retainer assembly secured to said first mold bowl lip and said second bowl lip holding said bowls in a nested position with said inner bowl being spaced from said outer bowl and not touching said outer bowl.

22. An apparatus assembly as claimed in claim 21 for forming a compound dessert in a predetermined shape wherein said bowl is semi-spherical and an inner surface of said dome shaped bowl mold and said second mold are coated with a nonstick material.

23. An apparatus assembly as claimed in claim 22 for forming a compound dessert in a predetermined shape wherein said nonstick compound is tetrafluroethlene.

24. An apparatus assembly as claimed in claim 22 for forming a compound dessert in a predetermined shape wherein said nonstick compound is fluorinated ethylene propylene.

25. An apparatus assembly as claimed in claim 21 for forming a compound dessert in a predetermined shape wherein said ring member has a plurality of tabs extending away from an axis taken through the center of the ring member, said labs extending outward from an axis through the center of the ring member at an angle ranging from about 120° to about 130°.

26. An apparatus assembly as claimed in claim 25 for forming a compound dessert in a predetermined shape wherein said tabs are positioned on an edge of said ring and are positioned 90° from each other.

* * * * *